United States Patent [19]
Ishikawa et al.

[11] 3,739,361
[45] June 12, 1973

[54] MAGENTIC THIN FILM MEMORY PLANE

[75] Inventors: Mutsuo Ishikawa, Nagareyama; Shiro Nakagawa, Chiba; Hiroyoshi Itoga, Ichikawa, all of Japan

[73] Assignee: TDK Electronics Corporation, Tokyo, Japan

[22] Filed: June 25, 1971

[21] Appl. No.: 156,862

[30] Foreign Application Priority Data

July 8, 1970 Japan ............................... 45/59702

[52] U.S. Cl. 340/174 S, 340/174 BC, 340/174 PW, 340/174 TF

[51] Int. Cl. ........................ G11c 11/04, G11c 11/14

[58] Field of Search ............ 340/174 BC, 174 PW, 340/174 S

[56] References Cited

UNITED STATES PATENTS 3,593,323 7/1971 Suzuki ......................... 340/174 BC

*Primary Examiner*—James W. Moffitt
*Attorney*—Milton J. Wayne and Erwin Koppel

[57] ABSTRACT

The word lines are arranged to cross the magnetic wires through which flows the digit current, and the surface in opposed relation with these word lines of the magnetic keeper which is disposed outwardly thereof, is applied with a thin electrically conductive film which is as a return line for the digit current.

4 Claims, 7 Drawing Figures

MAGENTIC THIN FILM MEMORY PLANE

BACKGROUND OF THE INVENTION

The present invention relates to an improvement of a magnetic thin film memory plane which is used as a main memory for electronic computers.

Magnetic thin film memory planes utilizing thin film circuit techniques are sometimes used instead of the core memory planes as the main or internal memories of the digital electronic computers. In general the magnetic thin film memory planes comprise a plurality of magnetic wires which are conductors of a beryllium-copper alloy coated with a magnetic material such as permalloy and are arrayed on a plane, and a plurality of strip conductors sandwiching these magnetic wires, the word drive current flowing through these strip conductors while the digit current flows through the magnetic wires. Such magnetic thin film memory planes may be driven with less current and at high speed as compared with the core memory planes, and have the benefit of a larger memory capacity in addition to other various advantages. However such magnetic thin film memory planes have many defects. In the magnetic thin film memory planes, the magnetic keepers of a suitable magnetic material are generally disposed outwardly of the strip conductors in order to prevent the influence of the external magnetic fields and the leakage of the magnetic fields which may influence adjacent memory cells due to the word drive current and in order to get less word current. Therefore the inductance of the circuit is increased so that it is difficult to accommodate digit current having a fast rise time. As for the two adjacent magnetic wires, they constitute the primary and secondary of a transformer with the magnetic keeper as a core so that the magnetic field produced by the current flowing through one magnetic wire will influence the other magnetic wire.

Various attempts have been made to overcome these problems of the magnetic thin film memory planes. One attempt was to use a pair of magnetic wires as going and return lines respectively. However, this attempt is unsatisfactory because the memory capacity is of course reduced to one half. Another attempt was to use the magnetic keepers made of metallic magnetic material, but this attempt is not satisfactory because an eddy current is produced in the magnetic keeper due to the magnetic fields which in turn are produced by the word drive current. When the thickness of the magnetic keeper is reduced in order to minimize the eddy current, the desired function of the magnetic keeper is lost.

It is therefore one of the objects of the present invention to overcome such objectional features characterizing the prior art magnetic thin film memory planes.

SUMMARY OF THE INVENTION

Briefly stated, the present invention provides an improved magnetic thin film memory plane in which a thin electrically conductive film is applied to the surface of a magnetic keeper which is disposed in opposed relation with a plurality of strip conductors which sandwich or cross a plurality of magnetic wires and is used as a return line for the digit current.

In general, the magnetic flux density within a conductor at a distance $x$ from the surface thereof is given by (the applied field is parallel with the surface)

$$Bx = \mu H \cdot \exp(- \sqrt{\omega K \mu / 2 \cdot x - J} \cdot \sqrt{\omega K \mu / 2 \cdot x}) \quad (1)$$

where $\mu$ = permeability;
$H$ = magnetic field applied;
$K$ = conductivity of the conductor; and
$\omega$ = angular velocity of magnetic field applied.

The effective magnetic flux $|Bx|$ is given by $$|Bx| = \sqrt{\mu H \cdot \exp(-} \sqrt{\omega K \mu / 2 \cdot x)} \quad (2)$$

Therefore the flux density $Bo$ on the surface of the conductor where $x = 0$ is given by $$Bo = \mu H \quad (3)$$

And the flux density at a distance $x = \sqrt{2/\omega K \mu}$ from the surface of the conductor is given by $$B = Bo/\exp 1 \quad (4)$$

In the case of a copper conductor, $\mu = 4\pi \times 10^{-7}$(H/m) and $K = 0.5 \times 10^8$(V/m), which is reduced to one-half to one-third when the copper conductor is plated. Assuming that the conductor is made of copper and plated, $K = 0.25 \times 10^8$(V/m), and the frequency of the applied magnetic field is 100 MHz, the distance $x$ at which the flux density is given by Eq.(4) is given by $$x = \sqrt{2/2\pi \times 100 \times 10^6 \times 0.25 \times 10^8 \times 4\pi \times 10^{-7}} \approx 10\mu$$

That is, in case of the copper conductor, the distance at which the flux density is of the order of 1/exp 1 of the flux density at the surface of the conductor is about 10 microns. It is seen that if the thickness of the thin electrically conductive film is one micron, the thin film will not influence the magnetic field produced by the word current made to flow through the strip conductors, that is, the desired function of the magnetic keeper may be carried out satisfactorily even when the thin electrically conductive film exists.

According to one embodiment of the present invention, a plurality of magnetic wires which are arrayed on a plane are sandwiched by a plurality of strip conductors or word drive lines and the surfaces of the magnetic keepers which are disposed in opposed relation with these word lines are applied with thin electrically conductive films, to which are electrically connected the magnetic wires so that the thin conductive films may be used as the return paths for the digit current. Because of this arrangement, the magnetic keepers are isolated from the circuits through which the digit current flows so that such problems encountered in the prior art magnetic thin film memory planes as the increase in inductance of the circuit and the formation of a transformer by the two adjacent magnetic wires with the magnetic keeper as the core may be avoided.

In another embodiment of the present invention, the thin conductive film comprises a plurality of strip-shaped thin conductive films so that the eddy currents produced in the thin film may be minimized.

The above and other objects, features and advantages of the present invention will become more apparent from the following description of the preferred embodiments thereof taken in conjunction with the accompanying drawing.

BRIEF DESCRIPTION OF THE DRAWING

FIG. 1-B is a sectional view thereof taken along the line A-A' of FIG. 1-A;

FIG. 1-C is a fragmentary perspective view thereof with the magnetic keepers and the grounding plates removed for clarity;

FIG. 4-B is a fragmentary top view illustrating the relation between the magnetic keeper shown in FIG. 4-A and the magnetic wires.

DESCRIPTION OF THE PREFERRED EMBODIMENTS

Figure 1A:
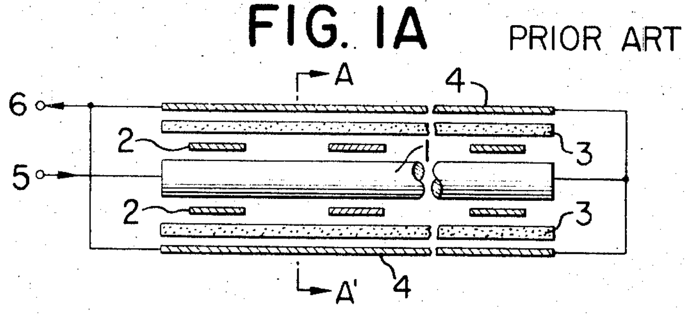
FIG. 1A PRIOR ART
FIG. 1-A is a sectional view of a prior art magnetic thin film memory plane.
Figure 1B:
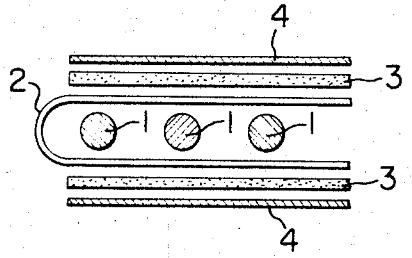
FIG. 1B PRIOR ART
Figure 1C:
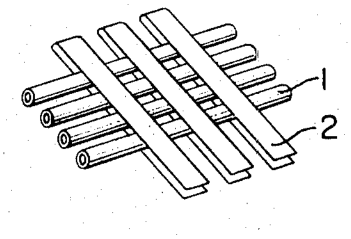
FIG. 1C PRIOR ART

Prior Art, FIGS. 1-A, 1-B and 1-C

Strip conductors 2 sandwich magnetic wires 1 each comprising a conductor of beryllium-copper alloy coated with a magnetic material such as permalloy, and magnetic keepers 3 of a suitable magnetic material and grounding plates 4 are disposed outwardly of the strip conductors 2. The magnetic wires 1 are used as the digit lines while the grounding plates 4 as the return lines thereof. The strip conductors 2 are used as the word lines. When the digit current flows through the magnetic wires 1 from a pair of terminals 5 and 6, the magnetic keepers 3 are included in the loops of the digit current consisting of the terminal 5, the magnetic wires 1, the grounding plates 4 and the terminal 6. Therefore, the inductance of this circuit is increased so that the digit current having a fast rise time finds it difficult to flow through the circuit. As for the two adjacent magnetic wires 1, they are regarded as forming the primary and secondary of a transformer whose core is the magnetic keeper 3, so that the digit current flowing through the grounding plates 4 from one of the two adjacent magnetic wires 1 will adversely affect the other magnetic wire. The present invention has for its object to overcome these defects encountered in the prior art magnetic thin film memory plane.

Figure 2:
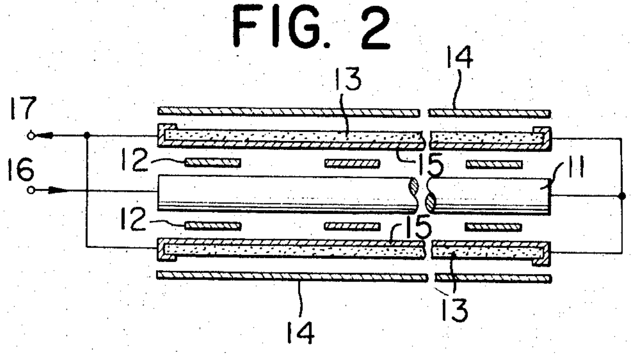
FIG. 2 is a sectional view of a first embodiment of a magnetic thin film memory plane in accordance with the present invention.
Figure 3:
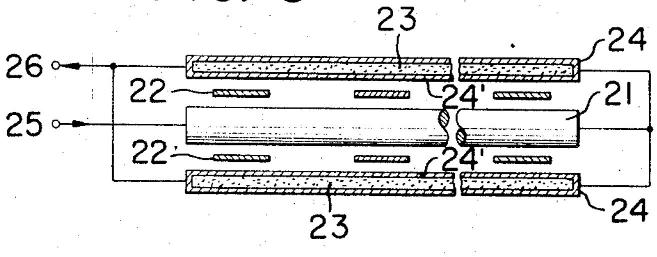
FIG. 3 is a sectional view of a second embodiment of the present invention.
Figure 4A:
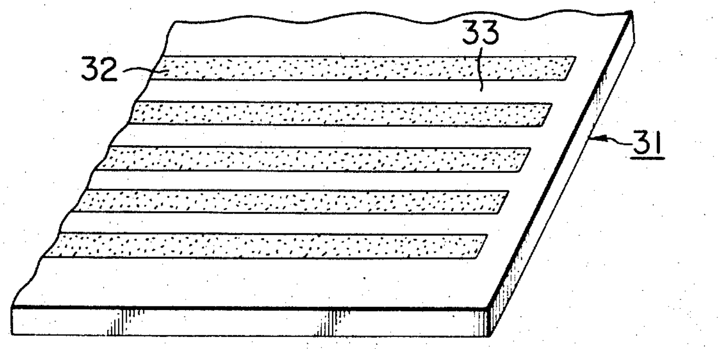
FIG. 4-A is a fragmentary perspective view illustrating a variation of a magnetic keeper used in a magnetic thin film memory plane in accordance with the present invention.
Figure 4B:
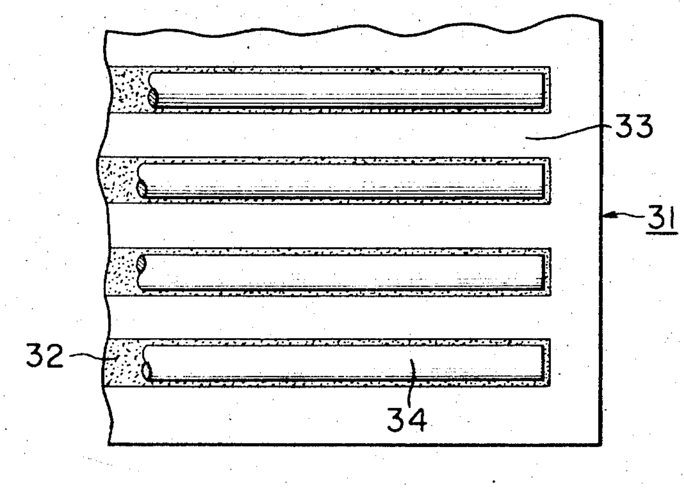

The Invention, FIGS. 2—4

A magnetic thin film memory plane in accord with the present invention illustrated in FIG. 2 is similar in construction to that illustrated in FIG. 1 except that an electrically conductive thin film 15 is coated upon the major surface of a magnetic keeper 13 which is in opposed or facing relation with strip conductors 12. In FIG.2, the magnetic wires are designated by 11 and the grounding plates by 14. Furthermore, it should be noted that the magnetic wires 11 are electrically connected to the thin films 15, which may be applied on the surfaces of the magnetic keepers 13 by non-electrolytic plating, etching or the like or by use of an adhesive agent.

When the digit current is made to flow from a terminal 16 to another terminal 17 in the memory plane of the type shown in FIG.2, the magnetic keepers 13 are isolated from the loops of the terminal 16, the magnetic wires 11, the thin films 15 and the terminal 17 so that the inductances of these loops are decreased. As a consequence, it becomes now possible to accommodate through the magnetic wires 11 digit current having a fast rise time. Furthermore, the adjacent magnetic wires 11 will not constitute a transformer with the magnetic keeper 13 as a core. The thickness of the conductive thin film 15 is of the order of one micron at the most so that the thin conductive film 15 will not influence the magnetic fields produced by the current flowing through the strip conductors 12.

A second embodiment of the present invention is illustrated in FIG.3, and is similar in construction to the first embodiment shown in FIG. 2 except that the magnetic keepers 23 have their all surfaces coated with electrically conductive thin films 24. Magnetic wires 21 are electrically connected to these conductive thin films 24 as in the case of the first embodiment, and the grounding plates are not shown for clarity. In the second embodiment, almost all of the digit current flows from one terminal 25 to another terminal 26 through a portion 24', having a relatively less inductance than the thin conductive film 24. The effects of the second embodiment are similar to those attained by the first embodiment.

The thin conductive films may be coated upon the magnetic keepers as shown in FIG.4-A. That is, a plurality of strip-shaped thin conductive films 33 are deposited upon the major surface of the magnetic keeper 31 by vacuum evaporation in mutually spaced apart relation with each other. Therefore the surface of the magnetic keeper 31 is exposed as indicated by 32. When such magnetic keeper 31 is used in a magnetic thin film memory plane, magnetic wires 34 are disposed in opposed relation with the exposed surfaces 32 of the magnetic keeper 31 as shown in FIG. 4-B, and strip conductors or word lines (not shown) are interposed between the magnetic wires 34 and the magnetic keeper 31 as in the cases of the first and second embodiments described above. The influence of the thin conductive films 33 upon the current flowing through the word lines may be substantially eliminated, and the eddy currents produced by the word current in the thin conductive films may be decreased.

What is claimed is:

1. A magnetic thin film memory plane of the type in which word lines are arranged to cross magnetic wires which are digit lines, and magnetic keepers are disposed outwardly of said word lines, said magnetic keepers having at least a surface facing said word lines, characterized in that a thin electrically conductive film is applied on said facing surface of each of said magnetic keepers, said film being electrically connected to said magnetic wires.

2. A magnetic thin film memory plane as set forth in claim 1, wherein the thickness of said film is less than the distance at which the magnetic strength of the magnetic field around said magnetic keeper is $B_0/\exp 1$, where $B_0$ is the flux density on the surface of the magnetic keeper.

3. A magnetic thin film memory plane as set forth in claim 1 wherein said thin electrically conductive film is applied to all of the surfaces of each of said magnetic keepers.

4. A magnetic thin film memory plane as set forth in claim 3 wherein said thin electrically conductive film applied on the facing surface of each of said magnetic keepers comprises a plurality of strip-shaped thin electrically conductive films extending in the longitudinal direction of said magnetic wires.

* * * * *